J. B. JOHNSON.
MACHINERY FOR SHAPING THE SOLES OF BOOTS AND SHOES.
No. 7,325. Reissued Sept. 26, 1876.
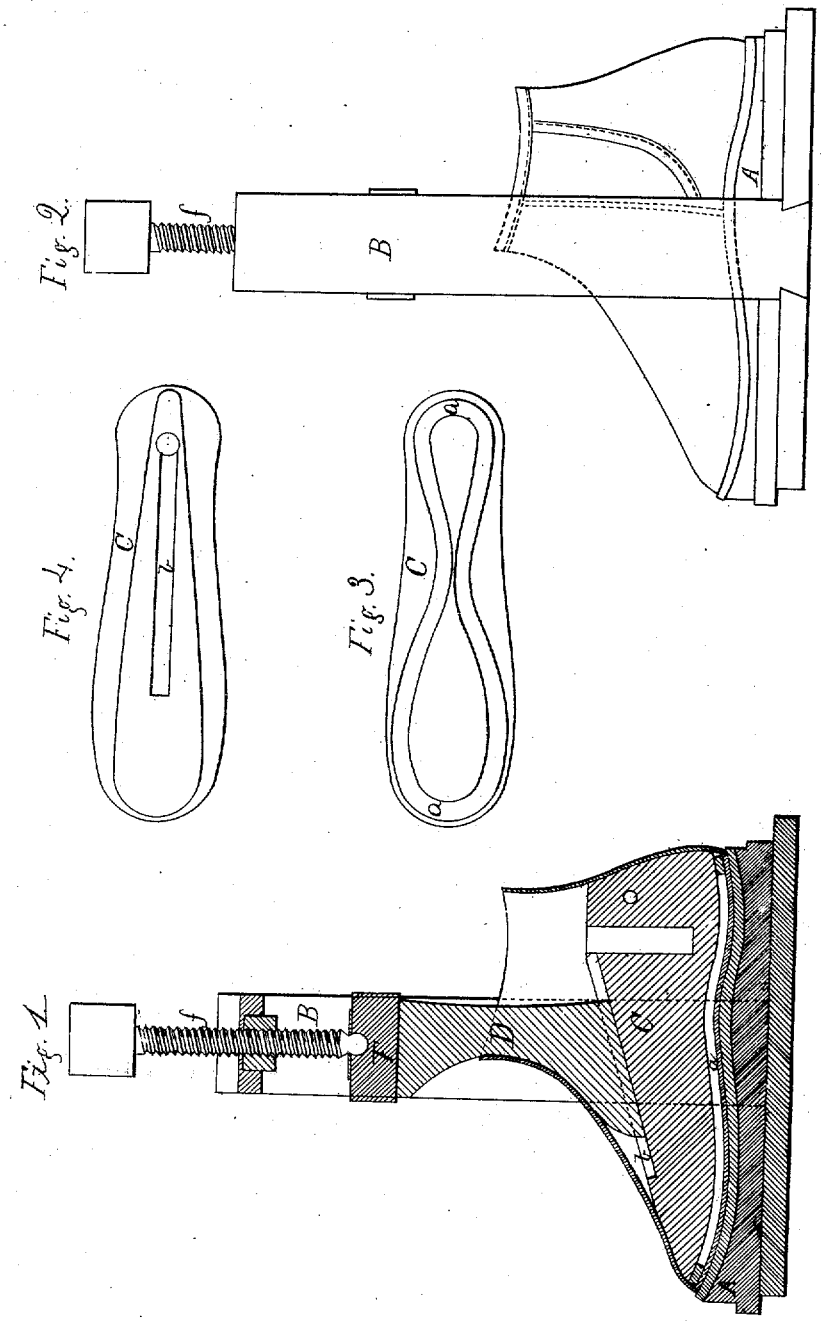
Witnesses
C. H. Fiske
Chas. B. Brooks.
Inventor.
Joseph B. Johnson

UNITED STATES PATENT OFFICE.

JOSEPH B. JOHNSON, OF LYNN, MASSACHUSETTS.

IMPROVEMENT IN MACHINERY FOR SHAPING THE SOLES OF BOOTS AND SHOES.

Specification forming part of Letters Patent No. 71,495, dated November 26, 1867; reissue No. 7,325, dated September 26, 1876; application filed October 25, 1875.

*To all whom it may concern:*

Be it known that I, JOSEPH B. JOHNSON, of Lynn, in the county of Essex and State of Massachusetts, have invented certain new and useful Improvements in Shaping Shoe-Soles after their fixation to their uppers; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1 denotes a vertical section of a sole-mold and a press, with a shoe and last with elastic applied thereto. Fig. 2 is an elevation of the same. Fig. 3 is a bottom view of the last with its elastic bottoming. Fig. 4 is a top view of the said last.

The common mode heretofore practiced for shaping the sole of a shoe, after such sole may have been sewed to the upper, has been to last the shoe and hammer the sole into conformity with the bottom of the last. This is a process requiring care and skill on the part of the workman. I accomplish the result by different means and to much better advantage.

I employ a mold, A, whose upper surface is the reverse of the form to be imparted to the sole. With this mold I use a screw-press, B, a presser, D, and a last, C. The latter is provided with an elastic bottoming, *a*. The presser D is a standard, extending from a groove in the last to the platen or slider F of the screw-press.

On inserting the last in the shoe, and placing the sole of the latter upon the mold, and the presser into the groove of the last, and screwing down the screw *f* of the press, the last will be forced down upon the sole of the shoe, and will crowd it into the mold, thus beating out the sole into the desired shape and pressing the flap of the groove of a sewed sole firmly and evenly down upon its seat. An elastic bottoming of the last serves to fit it to irregularities of the upper face of the sole.

My invention may be used to advantage on pegged as well as sewed work, the sole being thereby shaped and consolidated far more easily and effectively than by the hammering process.

What I claim as my invention is—

1. In a machine for shaping and consolidating the soles of boots and shoes, the combination, with a last and a presser, of a mold adapted to shape the sole after it has been united to the upper, all substantially as shown and described.

2. In combination, the press B, presser D, last C, and mold A, all constructed and arranged substantially as shown and described.

JOSEPH B. JOHNSON.

Witnesses:

C. H. FISKE,

CHAS. B. BROOKS.